United States Patent
Dultz et al.

(10) Patent No.: US 7,468,827 B2
(45) Date of Patent: Dec. 23, 2008

(54) DEVICE FOR GENERATING ADDING AND SUBTRACTING DIGITAL SEQUENCES OF OPTICAL PULSES AND METHOD FOR SECURE TRANSMISSION OF INFORMATION

(75) Inventors: Wolfgang Dultz, Frankfurt/M (DE); Heidrun Schmitzer, Cincinnati, OH (US); Leonid Beresnev, Columbia, MD (US); Gisela Dultz, Frankfurt/M (DE)

(73) Assignee: Deutsche Telekom AG (DE)

( * ) Notice: Subject to any disclaimer, the term of this patent is extended or adjusted under 35 U.S.C. 154(b) by 0 days.

(21) Appl. No.: 10/220,088

(22) PCT Filed: Jan. 24, 2001

(86) PCT No.: PCT/EP01/00766

§ 371 (c)(1),
(2), (4) Date: Nov. 21, 2002

(87) PCT Pub. No.: WO01/63353

PCT Pub. Date: Aug. 30, 2001

(65) Prior Publication Data

US 2003/0107792 A1    Jun. 12, 2003

(30) Foreign Application Priority Data

Feb. 26, 2000    (DE) ................. 100 09 209

(51) Int. Cl.
*G02B 1/00* (2006.01)
(52) U.S. Cl. ...................................... 359/237
(58) Field of Classification Search ............... 359/237, 359/244, 299, 298, 577, 578, 589; 380/256
See application file for complete search history.

(56) References Cited

U.S. PATENT DOCUMENTS

| 4,771,169 | A | * | 9/1988 | Boatmun | 250/214 LS |
| 5,307,410 | A | * | 4/1994 | Bennett | 380/256 |
| 5,353,114 | A | * | 10/1994 | Hansen | 356/477 |
| 6,188,497 | B1 | * | 2/2001 | Franck et al. | 398/183 |
| 6,272,224 | B1 | * | 8/2001 | Mazourenko et al. | 380/283 |
| 6,388,753 | B1 | * | 5/2002 | Hall et al. | 356/450 |

* cited by examiner

*Primary Examiner*—Joseph Martinez
(74) *Attorney, Agent, or Firm*—Kenyon & Kenyon LLP

(57) ABSTRACT

A device for generating, adding and subtracting digital sequences of optical pulses and a method for the secure transmission of information. An interferometer having at least one electro-optical switch or electro-optical modulator positioned in one of its branch sections is used so that binary optical pulse sequences may be added and/or subtracted in the context of an electro-optical device and a method for the secure transmission of information using optical signals.

12 Claims, 2 Drawing Sheets

US 7,468,827 B2

DEVICE FOR GENERATING ADDING AND SUBTRACTING DIGITAL SEQUENCES OF OPTICAL PULSES AND METHOD FOR SECURE TRANSMISSION OF INFORMATION

FIELD OF THE INVENTION

The present invention relates to a device for generating, adding and subtracting digital, including binary sequences of optical pulses, and to a method for the secure transmission of information.

RELATED TECHNOLOGY

One of the greatest problems to be overcome in the future of telecommunications may be to find ways to increase the security of information transmission and to protect the information to be transmitted from unauthorized tapping or unwanted corruption. One secure method provides for encoding the binary encoded message by adding it to a stochastic binary key, which is as long as the message itself. The result is a stochastic binary sequence, which can only be decoded by subtracting the key. This method, referred to as the "one time pad" method, is considered secure as long as the key, which is as long as the message itself, is only used once.

SUMMARY OF THE INVENTION

Example embodiments and/or example methods of the present invention are directed to increasing the security of information transmission and/or protecting the information to be transmitted from unauthorized tapping or unwanted corruption in reliable fashion and employing optical signals.

Optical signals may generate a great deal of interest because of their extremely high propagation rates, and because they may be processed in parallel and combined with existing electronic telecommunications devices.

A stochastic binary sequence, which may be used as a key, can be generated, for example, using an optical random-number generator, or it can be obtained electronically and converted into an optical signal.

DETAILED DESCRIPTION OF THE INVENTION

The present invention encompasses optical systems which may make it possible for two light pulse sequences to be generated and then optically added and/or subtracted.

An exemplary embodiment and/or exemplary method of the present invention is directed to having two optical pulse sequences A and B generated from existing electronic pulse sequences. One of these, carries, for example, the information, the other, the stochastic key. The interference that exists between the two synchronous pulse sequences may be used to optically add the random sequence to the optical pulse sequence that contains the information.

The binary addition or summing element of the present invention makes possible the direct addition of optical binary information, thus: 0+0=0, 1+0=0+1=1, 1+1=0. Since the subtraction in the binary, single-digit arithmetic (or, e.g., Euclidean) space corresponds to the addition, the element is also able to use this to subtract: 0−0=0, 1−0=0−1=1, 1−1=0.

From a continuous, non-pulsed, coherent light beam or a monotonic sequence of coherent optical pulses, the optical element described here may generate two differently encoded binary pulse sequences, the coding being arbitrarily externally predefinable. The two pulse sequences A, B may be subsequently added and/or subtracted interferometrically and received as output signals 01 and 02 in output 01 and 02, respectively.

Figure 1:
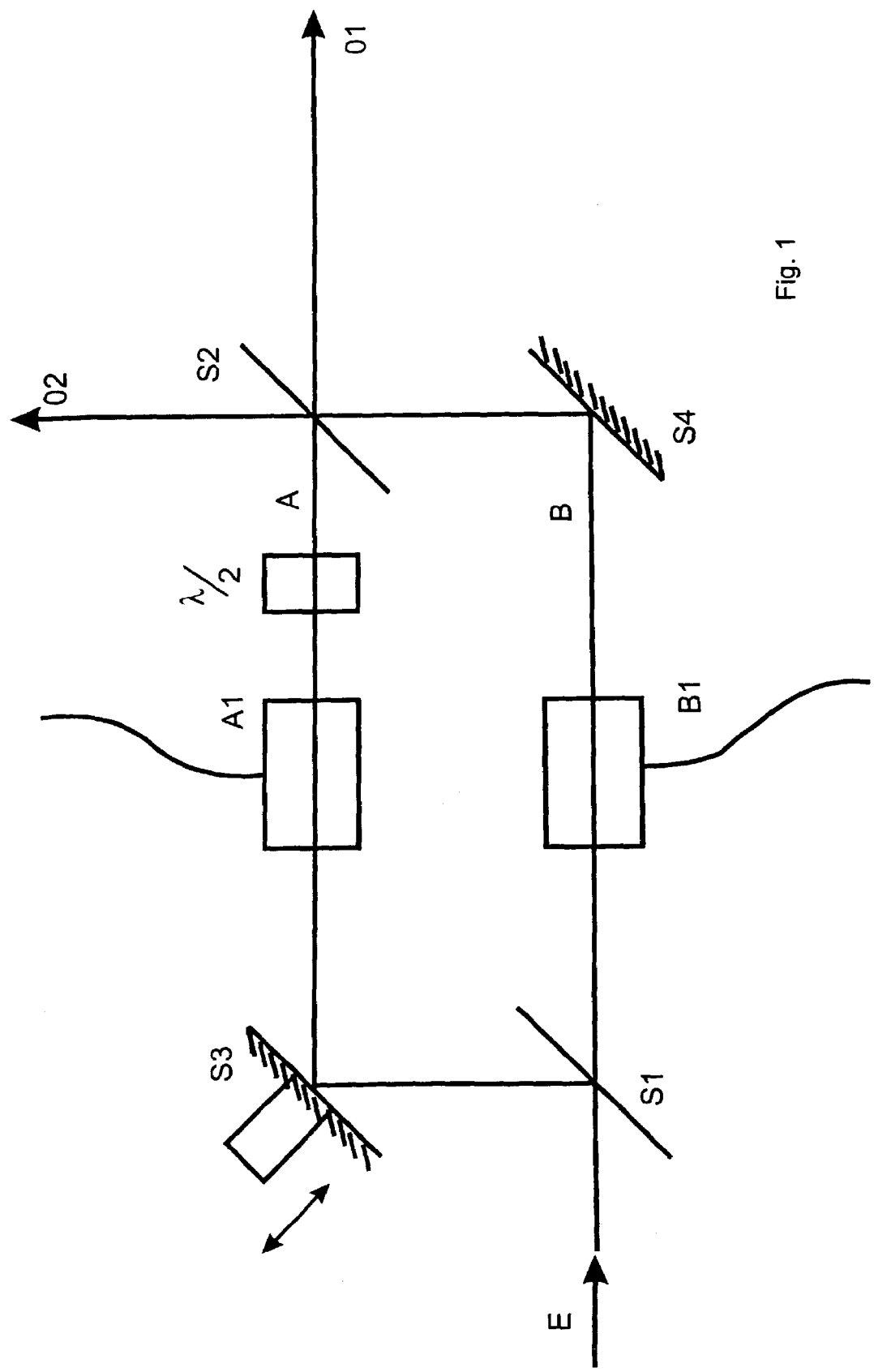
FIG. 1 illustrates a diagram of addition and subtraction elements, on the basis of a Mach-Zehnder interferometer, where mirror S3 being movable back and forth, for example, by a piezo element for precise tuning.

FIG. 1 illustrates a diagram of addition and subtraction elements, on the basis of a Mach-Zehnder interferometer, where mirror S3 being movable back and forth, for example, by a piezo element for precise tuning.

In FIG. 1, the Mach-Zehnder interferometer system with the assistance of two electro-optical switches A1, B1, allows impress of the electronically existing pulse sequences on a monotonic, coherent, optical pulse sequence or on a continuous, coherent light beam in input E of the interferometer.

In addition, in accordance with the present invention, two-dimensional signals are able to be processed when the electro-optical switches and modulators are employed together with an imaging system. The design of such systems may include a collective lens, which is positioned outside of the interferometer and in whose object plane may be situated the two-dimensional electro-optical modulators or switches. In addition, two very similar collective lenses may be positioned within the particular branch section of the interferometer; in any case, the useful signals may then be received in the image plane of the optical system.

Given high local coherence, i.e., given a small or punctiform light source or very parallel optical radiation, signals which are severely temporally incoherent, this means broadband signals, may occur, since the Mach-Zehnder interferometer, and some other interferometers described herein, are so-called white-light interferometers, which, in the context of an optical path difference of the two interferometer arms of less than about 3 µm, may be excellently suited for generating white-light interference patterns. Thus, for example, one single stochastic signal, which is injected in one of the branch sections, may be used for a multiplicity of spectrally separate optical frequencies. When the optical path length is adjusted by the difference amounting to approximately zero or around less than 0.5 µm, virtually the entire optical spectrum may be substantially utilized simultaneously, since this condition then corresponds more or less to the optical destructive white-light interference.

In accordance with FIG. 1, mirror S1 splits the monotonic pulse sequence into two monotonic pulse sequences of half intensity. Modulators A1, B1 impress the code containing the particular information on the two monotonic pulse sequences.

The one code may be, for example, a stochastic binary key, the other may contain the binary encoded message. One of the two pulse sequences undergoes a phase shift of half of a wavelength, e.g., a λ/2 delay.

The two pulse sequences are then brought to interference at mirror S2. If the interferometer is accordingly tuned, then, at output 01, a pulse sequence, corresponding to a sum or difference of binary pulse sequences A, B in both arms of the interferometer, leaves the interferometer. In this context, the interferometer may be tuned such that the optical paths are the same in both arms.

Due to the additional λ/2 delay, pulses which occur in both arms may interfere in such a way that they leave the interferometer at output 02.

Pulses which occur in only one arm may leave the interferometer at both outputs 01 and 02.

Pulses which do not occur in any of the arms may not occur in any of the outputs. For that reason, only in output 01 may one find a binary sum or difference of the two pulse sequences.

If one disregards the λ/2 delay plate, then the sum or difference occurs at output 02, but not, however, at output 01.

The electro-optical switches introduce the same additional optical paths in both arms. If this is not the case, then one may lengthen or shorten the optical path in one of the arms, e.g., by shifting mirror S3, making the optical paths in both arms the same again.

Figure 2:
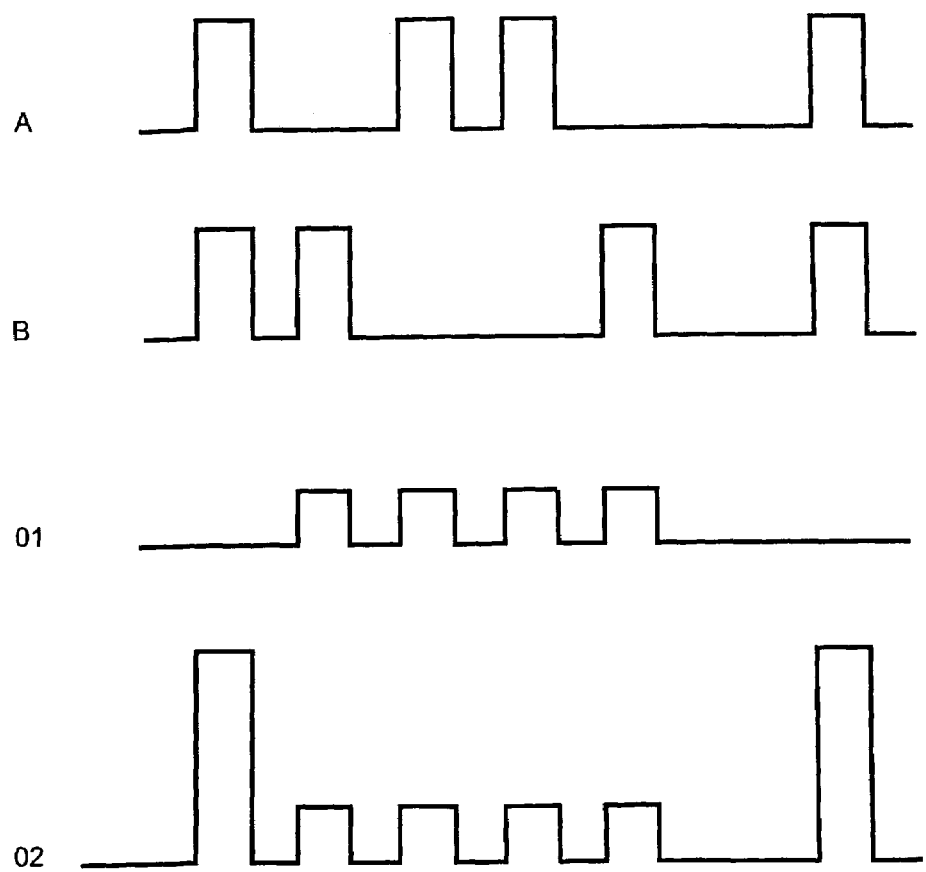
FIG. 2 illustrates a qualitative representation of an addition of pulse sequence A1 to pulse sequence B1, where 01 represents the added sequence in output 01 of the interferometer from FIG. 1; 02 representing the pulse sequence in the other output 02.

FIG. 2 illustrates an exemplary qualitative representation of an addition of pulse sequence A1 to pulse sequence B1, where 01 represents the added sequence in output 01 of the interferometer from FIG. 1 and 02 represents the pulse sequence in the other output 02.

In FIG. 2, on the basis of a method according to the present invention, the addition of two pulse sequences A, B is shown. Pulse sequence A is added to pulse sequence B; synchronous pulses in both sequences are observed at output 02. In this instance, the set-up according to FIG. 1, including the λ/2 delay, was used.

The pulse heights in FIG. 2 are only a qualitative representation of the ratios and are not necessarily true-to-scale.

Thus, underlying the addition and subtraction element, respectively, is that two coherent optical pulses are interferometrically made to zero by a phase shift of λ/2 in one output, and exit the interferometer in another output. A variety of types of interferometers may be used.

All two-beam interferometers may be used as a basis for the addition and/or subtraction element. Other possible exemplary embodiments, besides the Mach-Zehnder interferometer, include, for example, the Michelson interferometer or the Jamin interferometer.

The spatial splitting of a coherent light beam into two components may impress the two pulse encodings on the two beam components and the subsequent interferometric superposition either without a phase shift or with a phase shift of λ/2, depending on which output of the interferometer desired for use.

In the context of monochromatic light, whole multiples of the wavelengths may also be added to these phase shifts. As long as the entire optical path difference remains within the coherence length, this assertion applies to polychromatic light as well. The technology for this exists and involves, for example, delay plates or movable elements (such as mirrors) of the interferometer.

In further exemplary embodiments and/or exemplary methods of the present invention, a monotonic pulse sequence need not be injected already at the input of the interferometer. The pulses may also be generated, for example, by the electro-optical modulators or switches in the arms of the interferometer, together with the encoding.

In the present invention, using an addition element in telecommunications provides a practical situation for replacing all optical elements with corresponding fiber optic elements, such as replacing semi-transparent mirrors with fiber couplers, etc.

The present invention may also be implemented with intergrated optics.

What is claimed is:

1. An electro-optical device for at least one of generating, adding and subtracting binary optical pulse sequences, comprising:

an interferometer including at least one of an electro-optical switch and a modulator positioned in a branch section of the interferometer, wherein an interference pattern is generated by a phase shift in at least one of the electro-optical switch and the modulator in accordance with a stochastic digital optical signal, and the interferometer is a multibeam interferometer.

2. The electro-optical device of claim 1, wherein an interference is generated between the optical signal in the branch section having the at least one of the electro-optical switch and the modulator, and an injected binary optical signal.

3. The electro-optical device of claim 1, further comprising another at least one of an electro-optical modulator and switch positioned in another branch of the interferometer.

4. The electro-optical device of claim 3, wherein the binary optical signal is generated by the another at least one of the electro-optical modulator and switch.

5. The electro-optical device of claim 1, wherein the interferometer is a two-beam interferometer.

6. The electro-optical device of claim 1, wherein the interferometer is one of a Mach-Zehnder, a Michelson, and a Jamin interferometer.

7. The electro-optical device of claim 1, wherein the at least one of an electro-optical switch and a modulator is configured as two-dimensional and spatially resolved.

8. The electro-optical device of claim 1, wherein any optical element is an optical fiber element.

9. The electro-optical device of claim 1, wherein any optical element is an integrated optical element.

10. The electro-optical device of claim 1, wherein the stochastic digital optical signal had been converted from a stochastic binary sequence using an optical random-number generator.

11. A method for the secure transmission of information using optical signals, comprising:

generating optical pulse sequences in an electro-optical device for at least one of generating, adding and subtracting binary optical pulse sequences, wherein the electro-optical device is configured to include an interferometer which has at least one electro-optical switch and modulator positioned in a branch section of the interferometer, wherein an interference pattern is generated by a phase shift in at least one of the electro-optical switch and the modulator; and generating a phase shift in both arms of the interferometer, the interferometer configured as a two-beam interferometer having an output, wherein when there is a superposition of two light pulses at the output of the interferometer, the output contains destructive interference of the two light pulses.

12. A communications system comprising:

an electro-optical device for at least one of generating, adding and subtracting binary optical sequences for generating optical pulse sequences to effect a secure transmission of information, wherein the electro-optical device includes an interferometer having at least one of an electro-optical switch and a modulator positioned in a branch section of the interferometer, wherein an interference pattern is generated by a phase shift in at least one of the electro-optical switch and the modulator in accordance with a stochastic digital optical signal, and wherein the at least one of an electro-optical switch and a modulator is configured as two-dimensional and spatially resolved.

* * * * *